July 11, 1967 A. W. DE VAUX 3,330,256
TIMED ANIMAL FEEDING DEVICE
Filed March 21, 1966
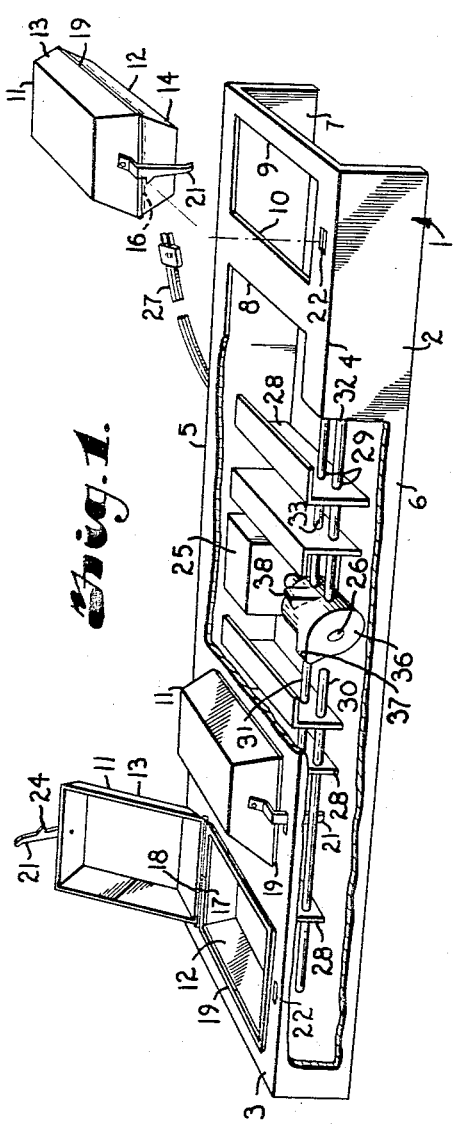
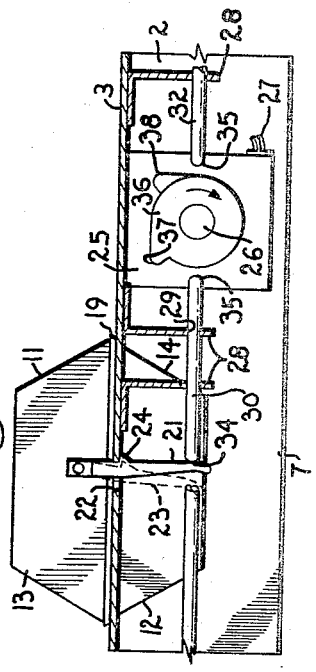
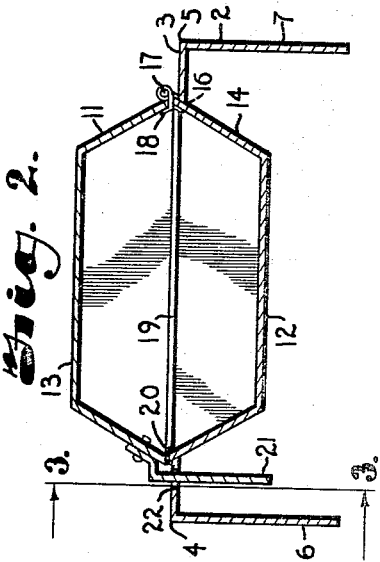
INVENTOR.
ALFRED W. DE VAUX
BY
ATTORNEYS

United States Patent Office 3,330,256
Patented July 11, 1967

3,330,256
TIMED ANIMAL FEEDING DEVICE
Alfred W. De Vaux, 12806 E. 50th Terrace,
Independence, Mo. 64050
Filed Mar. 21, 1966, Ser. No. 536,071
2 Claims. (Cl. 119—51.12)

ABSTRACT OF THE DISCLOSURE

An animal feeder including a plurality of food containers removably retained in a support member, each of the containers having a hinged lid with a latch arm normally extending into the support member and engaged therewith. A cam member having multiple cam surfaces is retained by a timer to sequentially urge movable rods against the respective latch arms for releasing the lids in timed sequence.

---

This invention relates to feeding devices for animals such as dogs and cats which are preferably fed with a high degree of regularity and, more particularly, to such devices in which several meals may be retained within easy reach of the animal but closed to prevent access until a predetermined time.

The principal objects of the present invention are: to provide a new and improved animal feeder which is effective for keeping food out of the reach of the animal until the proper time; to provide such a device in which several separate meals can be placed in advance; to provide such a device having individual removable easily cleaned containers for the respective meals; to provide such apparatus which requires very few moving parts and yet is flexible; and to provide such a device which is simple and inexpensive in construction and rugged in use.

Other objects and advantages of this invention will become apparent from the following description taken in connection with the accompanying drawings wherein are set forth by way of illustration and example certain embodiments of this invention.

FIG. 1 is a perspective partially exploded view of a feeding device embodying this invention with portions broken away to show operating parts.

FIG. 2 is a vertical cross-sectional side elevation through the device particularly showing a food container in closed position.

FIG. 3 is a vertical fragmentary cross-sectional front elevation taken on the line 3—3, FIG. 2, particularly showing the operation of a food container latch.

Referring to the drawings in more detail:

The reference numeral 1 generally indicates an animal feeding device embodying this invention. The device 1 comprises a support member 2, in this example, formed of a sheet metal, plastic or similar material, having an elongated top horizontal portion 3 with a front edge 4 and a rear edge 5. The material forming the support member 2 is bent downwardly at the front and rear edges 4 and 5 respectively forming depending leg portions 6 and 7 which, when resting on the ground, support the top portion 3 in an elevated position as seen in FIG. 1. The top portion 3, in this example, has a plurality of rectangular openings 8 therethrough and extending in slightly staggered relation therealong between the front and rear edges 4 and 5. The openings 8 are defined by inwardly directed edges 9 respectively forming inner rectangular vertically open peripheries 10.

A plurality of food containers 11 each have a lower rectangular food receiving bowl or portion 12 and an upper rectangular lid portion 13. The lower portion 12 includes inwardly and downwardly sloping planar sides 14 presenting an outer rectangular periphery 16 which decreases from a size greater to a size smaller than the respective inner peripheries 10. The lower portions 12 are thus respectively removably received or keyed in the rectangular openings 9 for supporting the food containers in non-rotating relation with respect to the top portion 3. The lower portions 12 depend beneath the top portion 3 when the food containers are received thereinto as best illustrated in FIG. 2 and lend stability to the assembly while permitting easy upward removal of the food containers for filling and/or cleaning.

A hinge 17 connects one edge of each lid portion 11 to one edge of the respective lower or food receiving portions 12. A spring member 18 is associated with each of the hinges 17 and operates to urge the lid portions 11 pivotally upwardly and rearwardly of the food receiving portion 12 so as to expose the interior thereof. A suitable rubber lip or seal 19 is received over the upper edge 20 of the food receiving portion 12 to provide a suitable seal against exposure of food within the containers when the lid portion 13 is in closed position as noted below.

An elongated latch arm 21 is secured rigidly at one end thereof to each of the lid portions 13 in a position preferably diametrically opposed from the hinge 17 and extends generally tangentially of the hinge toward the food receiving portion 12. A plurality of latch arm openings 22 are formed in the top portion 3 respectively adjacent each of the rectangular openings 9 in staggered relation with the front edge 4. The latch arm openings are positioned whereby the respective latch arms 21 extend downwardly therethrough and beneath the top portions 13 when the food containers are received in the rectangular openings 9 and the lid portions 13 are urged to a closed position.

The latch arms 21 are constructed of an elastically deformable material such as spring steel and are thus slightly elastically displaceable laterally of the lid portions 13, as illustrated by the broken lines 23, FIG. 3. The latch arms 21 each have a protrusion or barb 24 thereon which forms a latching structure by engaging the lower surface of the top portion 3 adjacent the latch arm opening 22 when the lid portion 13 is closed. The barb 24 is of a size, shape and position whereby it is released from engagement with the underside of the top portion 3 when the latch arm 21 is displaced as at 23.

A timer mechanism 25 is secured to the support member 2, in this example, between the leg portions 6 and 7 and beneath the top portion 3. The timer mechanism 25 may be of any suitable type having a shaft 26 extending therefrom and rotatable at a predetermined timing speed. In this example, the timer mechanism 25 is electrically operated through a suitable power line 27; however, it is to be understood that a mechanical spring power timer or the like will also provide suitable operation.

Guide members 28 are suspended beneath the top portion 3 and between the leg portions 6 and 7 and have pairs of transverse openings 29 therethrough aligned longitudinally of said support member 2. A plurality of longitudinally rigid rods 30, 31, 32 and 33 are respectively axially slidable in said openings 29 and supported by the guide members 28 in a direction extending horizontally laterally of the latch arms 21 and respectively engageable at one end 34 thereof with said latch arms, FIG. 3. The respective rods 30, 31, 32 and 33 terminate at the opposite ends 35 thereof centrally of the support member 2 near the timer mechanism shaft 26. The rods 30 and 32 are of greater length than the rods 31 and 33 whereby the respective rod ends may assume the positions indicated above although the respective latch arms 21 are spaced apart along the top portion 3.

A cam member 36 is suitably fixed to the timer mechanism shaft 26 and has a pair of radially protruding cam surfaces 37 and 38 respectively positioned in circular paths which intersect the ends 35 of the rods 30 and 32 and the rods 31 and 33. It is noted, however, that in this example, the respective ends of the rod pair 30 and 31 and the pair 32 and 33 are separated by 180 degrees and the cam surfaces 37 and 38 are rotatably staggered 90 degrees.

In operation, the respective food containers may be removed from the support member 2 for cleaning and a meal then placed in each container. The containers are then replaced in the respective openings 9 and the lid portion 13 closed whereupon the respective latch arms 21 are inserted through the latch arm openings 22. The barb 24 on each latch arm is engaged with the support member to maintain the container locked in a closed position and sealed against outside contamination. When the timer mechanism shaft rotates once each 48 hours, the cam 36 may be placed in a position whereby the cam surface 38 is pointed upwardly. Twelve hours will then be required for the cam surface 38 to contact and move the end 35 of the rod 33. The movement of the rod 33 will cause one of the latch arms 21 to be deflected laterally until the barb 24 thereon is released and the spring 18 forces the lid portion of that container open whereupon the animal has access to the meal contained therein. Twelve hours later, the cam surface 37 will contact and move the end 35 of the rod 32 whereupon a second container is opened. After an additional twelve hours, the cam surface 38 will contact and move the end 35 of the rod 31 opening a third container and after a further twelve hour period, the cam surface 37 engages and moves the end 35 of the rod 30 (FIG. 3) causing the fourth container to open.

It is to be understood that although one form of this invention has been illustrated and described, it is not to be limited thereto except insofar as such limitations are included in the following claims.

What I claim and desire to secure by Letters Patent is:
1. An animal feeder comprising:
 (a) a support member having a top portion,
 (b) a plurality of food containers associated with said top portion, said food containers each having a lower food receiving portion and an upper lid portion,
 (c) a hinge pivotally connecting said respective lid portions with respect to said lower portions, resilient members respectively associated with said food containers and urging said lid portions toward an open position,
 (d) latch means on each of said lid portions, means on said support member and cooperating with said respective latch means to normally maintain said lids in a closed position,
 (e) a timer mechanism secured with respect to said support member, and means cooperating between said timer mechanism and said latch means to sequentially release said latch means whereupon said lid portions sequentially open at predetermined intervals,
 (f) said timer mechanism having a shaft extending therefrom rotatable at a predetermined speed, guide members suspended beneath said top portion, a plurality of rods axially slidable on said guide members and respectively engageable with said last named cooperating means, and
 (g) a cam member on said shaft and having a plurality of cam surfaces respectively engageable with said rods, said cam surfaces being rotatably staggered whereby said rods are selectively moved on said guide members to sequentially release said lid portions.

2. An animal feeder comprising:
 (a) a support member having a top portion,
 (b) a plurality of food containers associated with said top portion, said food containers each having a lower food receiving portion and an upper lid portion,
 (c) a hinge pivotally connecting said respective lid portions with respect to said lower portions, resilient members respectively associated with said food containers and urging said lid portions toward an open position,
 (d) latch means on each of said lid portions, means on said support member and cooperating with said respective latch means to normally maintain said lids in a closed position,
 (e) a timer mechanism secured with respect to said support member, and means cooperating between said timer mechanism and said latch means to sequentially release said latch means whereupon said lid portions sequentially open at predetermined intervals,
 (f) said latch means comprising an elongated latch arm secured to each of said lid portions and extending therefrom and including,
 (g) a plurality of latch arm openings in said top portion and respectively adjacent said food receiving portions, said latch arms extending through said latch arm openings and beneath said top portion when said food receiving portions are received in said receiving means and said lid portions are urged to a closed position,
 (h) said latch arms being elastically displacable laterally of said lid portion and having a barb thereon normally engaging said top portion adjacent said latch arm openings and releasable therefrom through lateral displacement of said latch arm by said last named cooperating means.

References Cited

UNITED STATES PATENTS

| | | | |
|---|---|---|---|
| 461,457 | 10/1891 | Terry | 119—51.13 |
| 641,920 | 1/1900 | Askew | 119—51.12 |
| 1,124,859 | 1/1915 | Caspari | 119—51.12 |
| 2,157,682 | 5/1939 | Sweeny | 119—63 |

FOREIGN PATENTS 12,713  11/1909  Denmark.

SAMUEL KOREN, *Primary Examiner.*

HUGH R. CHAMBLEE, *Examiner.*